United States Patent
Kim (10) Patent No.: US 9,897,196 B2
(45) Date of Patent: Feb. 20, 2018

(54) CUBE-TYPE ELECTRONIC AUTOMATIC TRANSMISSION

(71) Applicant: Hyundai Motor Company, Seoul (KR)

(72) Inventor: Eun-Sik Kim, Kwangmyong-Shi (KR)

(73) Assignee: Hyundai Motor Company, Seoul (KR)

( * ) Notice: Subject to any disclaimer, the term of this patent is extended or adjusted under 35 U.S.C. 154(b) by 642 days.

(21) Appl. No.: 14/550,971

(22) Filed: Nov. 22, 2014

(65) Prior Publication Data

US 2015/0292614 A1  Oct. 15, 2015

(30) Foreign Application Priority Data

Apr. 11, 2014  (KR) .................. 10-2014-0043635

(51) Int. Cl.
*F16H 59/12* (2006.01)
*F16H 59/10* (2006.01)

(52) U.S. Cl.
CPC ........... *F16H 59/12* (2013.01); *F16H 59/105* (2013.01)

(58) Field of Classification Search
CPC ............................. F16H 59/12; F16H 59/105
USPC .................................. 74/473.12; 463/37, 38
See application file for complete search history.

(56) References Cited

U.S. PATENT DOCUMENTS

| | | | |
|---|---|---|---|
| 4,177,993 A | 12/1979 | Crosby et al. | |
| 8,017,879 B2 * | 9/2011 | Yang | G06F 3/0202 200/5 A |
| 9,131,783 B2 * | 9/2015 | Chacon | A47C 31/008 |
| 2005/0255915 A1 * | 11/2005 | Riggs | A63F 13/06 463/37 |
| 2015/0107392 A1 * | 4/2015 | Wang | F16H 59/08 74/473.12 |

FOREIGN PATENT DOCUMENTS

| | | |
|---|---|---|
| EP | 2 329 867 A1 | 6/2011 |
| KR | 1999-0086381 A | 12/1999 |
| KR | 10-2005-0008100 A | 1/2005 |
| KR | 10-2013-0067961 A | 6/2013 |
| KR | 10-1410663 B1 | 6/2014 |

* cited by examiner

*Primary Examiner* — William C Joyce
(74) *Attorney, Agent, or Firm* — Morgan, Lewis & Bockius LLP

(57) ABSTRACT

A cube type electronic shift lever including a shift lever panel mounted on a console surface or a center fascia of a vehicle, and having a seating unit including a plurality of position fixing magnets, a plurality of cube type buttons including metallic plates coupled to lower portions of the plurality of cube type buttons, the plurality of cube type buttons being detachably installed on the seating unit of the shift lever panel, an operating unit embedded in each of the plurality of cube type buttons, and sending operational signals generated by the each of the plurality of cube type buttons, and a control unit configured to transmit the operational signals sent by each of the plurality of cube type buttons to a transmission control unit (TCU) or an electronic control unit (ECU) of the vehicle, in which shapes and functions of the cube type buttons are arbitrarily selected.

9 Claims, 5 Drawing Sheets

CUBE-TYPE ELECTRONIC AUTOMATIC TRANSMISSION

CROSS-REFERENCE TO RELATED APPLICATIONS

The present application claims priority to Korean Patent Application No. 10-2014-43635, filed Apr. 11, 2014, the entire contents of which is incorporated herein for all purposes by this reference.

BACKGROUND OF THE INVENTION

Field of the Invention

The present invention relates to a button type electronic shift lever, and more particularly, to a cube type electronic shift lever in which a plurality of cube type buttons are detachably installed on a shift lever panel on which a seating unit having a plurality of position fixing magnets is formed, and the plurality of cube type buttons is configured to allow a driver to be able to arbitrarily select shapes and options of the plurality of cube type buttons, thereby allowing the driver to conveniently manipulate the cube type electronic shift lever, and reflecting the driver's needs.

Description of Related Art

In general, a transmission is an apparatus that transmits power generated by an engine to drive wheels while changing rotational force and speed depending on a driving state of a vehicle, and is classified into a manual transmission and an automatic transmission.

A driver who drives the vehicle may manipulate a shift lever, which is mounted on a console surface at the periphery of a driver seat or mounted on a steering handle, so as to change a gear shift stage of the manual transmission or the automatic transmission to a desired gear shift stage.

The manual transmission is operated in a manner in which when the driver selects a gear, which is suitable for a driving state of the vehicle, using the shift lever, a movement desired by the driver is transmitted to the manual transmission through a cable or a rod. The automatic transmission is operated in a manner in which the driver drives an inhibitor switch through a cable by moving the shift lever so as to transmit a movement desired by the driver to the automatic transmission.

Particularly, recently, instead of a mechanical shift lever, usage of an electronic shift lever, which substitutes a mechanical connection structure between the transmission and the shift lever with an electrical connection structure using an actuator and an ECU is increased.

The electronic shift lever does not have a mechanical cable connection structure unlike the mechanical shift lever, and needs to have a position sensor unit that converts the driver's intention of shifting gears into an electronic signal, but there are advantages in that the driver may efficiently and conveniently manipulate the shift lever.

As the types of electronic shift levers, there are a lever type electronic shift lever in which an electronic shift lever protruding from a console surface of the vehicle is manipulated forward and rearward, a dial type electronic shift lever in which a cylindrical electronic shift lever mounted on the console surface of the vehicle is manipulated by being rotated leftward and rightward, a column type electronic shift lever in which an electronic shift lever mounted at a side of the steering handle of the vehicle is manipulated upward and downward, and a button type electronic shift lever in which a button on which gear shift stages of the vehicle are indicated is manipulated by being pressed.

However, the lever type electronic shift lever in the related art has a problem in that a trajectory of rectilinear movement thereof is significantly long because the driver needs to move the entire arm in a front and rear direction or in a left and right direction when manipulating the lever type electronic shift lever, has no great advantage as the electronic shift lever in comparison with a mechanical shift lever because the lever type electronic shift lever is manipulated in a manner similar to a manipulation manner of the mechanical shift lever, and has a problem in that there is a risk that the driver's head may be injured by colliding with the shift lever at the time of a vehicle collision because the shift lever protrudes above the console surface.

When the dial type electronic shift lever in the related art is manipulated, a trajectory of rectilinear movement is hardly generated, but there is a problem in that stress is put on the driver's wrist and it is inconvenient for the driver to manipulate the dial type electronic shift lever because the driver manipulates the dial type electronic shift lever while rotating the wrist.

The column type electronic shift lever in the related art has an advantage in that a distance from the steering handle is short, but has a problem in that a dynamic trajectory thereof is significantly long because the driver needs to twist the driver's arm to manipulate the column type electronic shift lever.

Particularly, the button type electronic shift lever in the related art has an advantage in that the button type electronic shift lever is manipulated conveniently and intuitively, but has a drawback in that all of a P-stage button, an R-stage button, an N-stage button, and a D-stage button need to be displayed within a limited space of the shift lever, and thus intervals between the buttons become short.

A plurality of functional buttons, which may perform various functions such as an audio system, a heater, and an electric parking brake (EPB), is disposed on a dashboard of the vehicle so as to enhance the convenience in driving the vehicle.

However, the electronic shift lever and the plurality of functional buttons occupy a large layout in the vehicle, and are disposed to be spaced apart from each other over a large area, and as a result, there is a problem in that it is very difficult for the driver to manipulate the electronic shift lever and the plurality of functional buttons at one time.

The electronic shift lever and the plurality of functional buttons are fixed on the console surface or a center fascia of the vehicle, and as a result, there is a problem in that the driver's various needs cannot be absolutely reflected when the vehicle is manufactured.

The plurality of buttons is complicatedly spaced out, and as a result, there are problems in that it is difficult for the driver to identify the functions performed by the respective buttons at one time, and the interior of the vehicle becomes complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cube type electronic shift lever in which various buttons of the vehicle may be disposed and controlled in a unified manner such that production costs are reduced, and the driver may dispose a desired gear shift stage button and the like at a location where the driver may most conveniently manipulate the button, thereby remarkably improving operational characteristics of the vehicle, and the driver may arbitrarily select a desired size, shape, color and the like of the cube type button such that the driver's various needs may be reflected.

Technical problems to be achieved in the present invention are not limited to the aforementioned technical problems, and any other not-mentioned technical problems will be obviously understood from the description below by those skilled in the technical field to which the present invention pertains.

According to various aspects of the present invention, a cube type electronic shift may include a shift lever panel mounted on a console surface or a center fascia of a vehicle, and having a seating unit including a plurality of position fixing magnets, a plurality of cube type buttons including metallic plates coupled to lower portions of the plurality of cube type buttons, the plurality of cube type buttons being detachably installed on the seating unit of the shift lever panel, an operating unit embedded in each of the plurality of cube type buttons, and sending operational signals generated by each of the plurality of cube type buttons, and a control unit configured to transmit the operational signals sent by the each of the plurality of cube type buttons to a transmission control unit (TCU) or an electronic control unit (ECU) of the vehicle in which shapes and functions of the plurality of cube type buttons are arbitrarily varied and selected.

The operating unit may include a touch sensor installed on an upper surface of each of the plurality of cube type buttons, and recognizing an operation of each of the cube type buttons, a sending part connected to a lower portion of the touch sensor by a connecting pin, and creating and sending an operational signal, and a first power supply pin extending from a lower portion of the sending part to a metallic plate disposed on each of the lower portions of each of the cube type buttons.

The sending part may be a radio-frequency identification (RFID) tag configured so that each of the plurality of cube type buttons sends different electric waves.

Each of the plurality of position fixing magnets may include a power supply portion in contact with each metallic plate of each of the plurality of cube type buttons, and supplying electric power to each metallic plate, and a magnet portion coupled to the power supply portion, and in contact with each metallic plate to fix each metallic plate.

The control unit may include a reader coupled in the shift lever panel, and reading the operational signals sent from the operating unit, and a second power supply pin extending from the power supply portion to the reader, and supplying electric power to the reader.

The reader may be a radio-frequency identification (RFID) reader configured to read electric waves generated by the plurality of cube type buttons and sent through the operating unit.

The plurality of position fixing magnets may be disposed at equal intervals on a bottom surface of the seating unit of the shift lever panel.

The plurality of cube type buttons may include one or more buttons among a P-stage button which generates an operational signal that changes a gear shift stage of the vehicle to a P-stage, an R-stage button which generates an operational signal that changes the gear shift stage of the vehicle to an R-stage, an N-stage button which generates an operational signal that changes the gear shift stage of the vehicle to an N-stage, and a D-stage button which generates an operational signal that changes the gear shift stage of the vehicle to a D-stage.

The plurality of cube type buttons may further include functional buttons, configured to perform various types of functions, in addition to the P-stage button, the R-stage button, the N-stage button, and the D-stage button.

The plurality of cube type buttons may have one or more shapes among a square block shape, a rectangular block shape, an L-shaped block shape, and a C-shaped block shape.

According to the present invention having the aforementioned configuration, the plurality of cube type buttons is detachably installed on the shift lever panel having the seating unit having the plurality of position fixing magnets, such that the driver's various needs may be reflected, thereby improving marketability of the vehicle.

That is, the driver may configure the seating unit of the shift lever panel by utilizing various cube type buttons, thereby variously configuring the cube type buttons having desired sizes, shapes, and colors.

The driver may install functional buttons, which are configured to perform various types of functions, on the shift lever panel in addition to the P-stage button, the R-stage button, the N-stage button, and the D-stage button, such that various buttons of the vehicle may be disposed and controlled in a unified manner, thereby remarkably reducing production costs of the vehicle.

The driver may dispose the desired gear shift stage at a location where the driver may most conveniently manipulate the gear shift stage, and may arbitrarily add or eliminate the functional buttons desired by the driver, such that operational characteristics of the shift lever may be remarkably improved.

The gear shift stage buttons and the various functional buttons may be integrally disposed on the shift lever panel, such that a button layout of the vehicle is greatly reduced, thereby increasing a space suitable for accommodating a cup holder or various types of items.

The plurality of cube type buttons including the gear shift stage buttons and the functional buttons may be configured to have different shapes and colors, respectively, thereby remarkably improving visibility of the driver.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
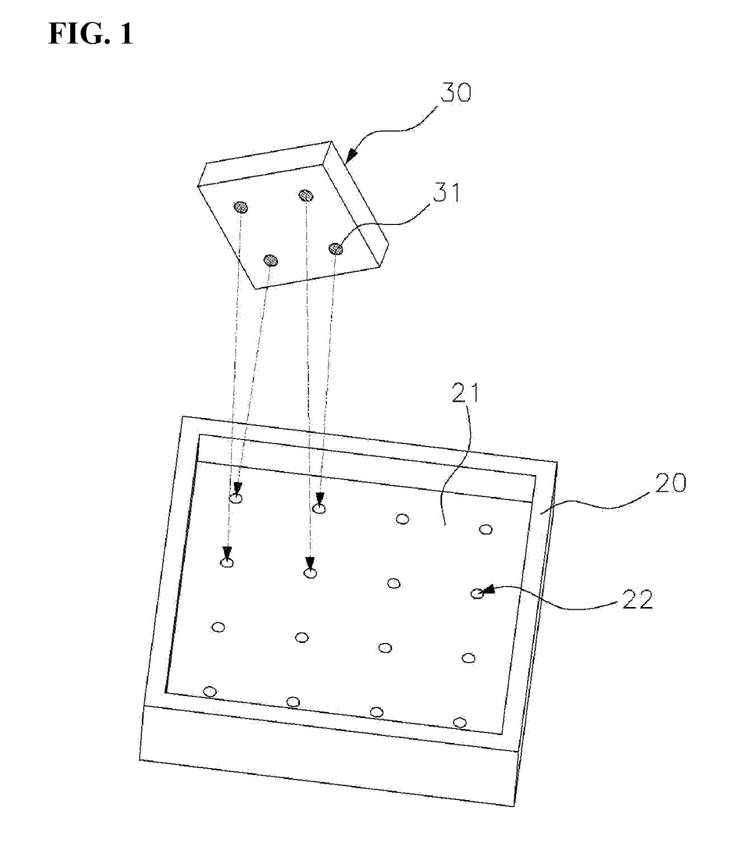
FIG. 1 is a perspective view illustrating an appearance in which exemplary cube type buttons and a shift lever panel are coupled according to the present invention.
Figure 2A:
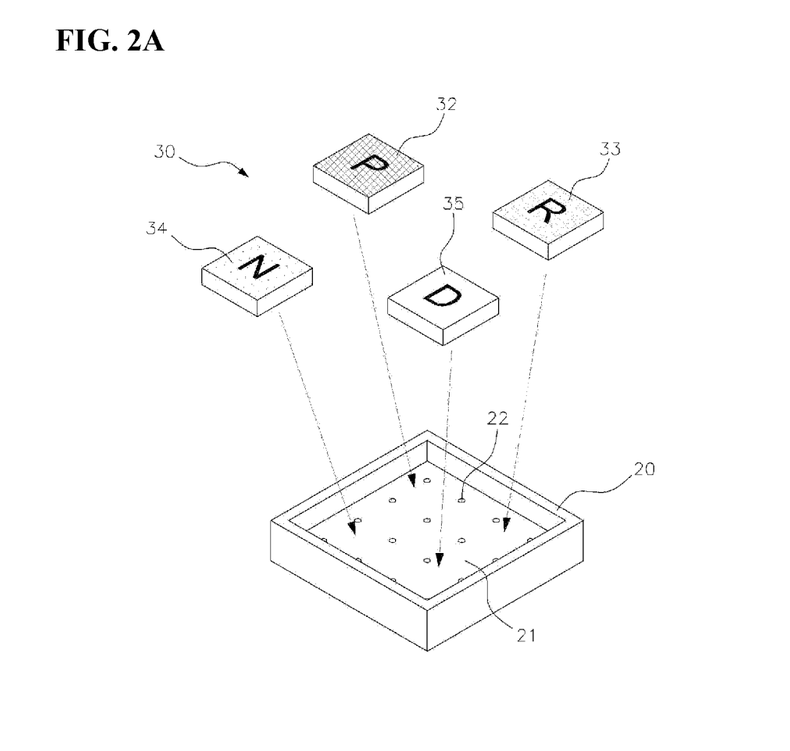
FIG. 2A is an exploded perspective view illustrating an appearance in which the exemplary cube type buttons and the shift lever panel are separated according to the exemplary embodiment of the present invention.
Figure 2B:
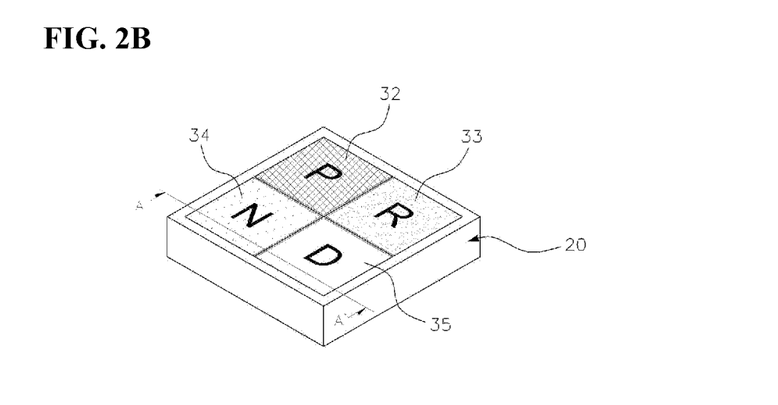
FIG. 2B is a perspective view illustrating an appearance in which the exemplary cube type buttons and the shift lever panel are assembled according to the present invention.

FIG. 1 is a perspective view illustrating an appearance in which cube type buttons 30 and a shift lever panel 20 according to various embodiments of the present invention are coupled, FIG. 2A is an exploded perspective view illustrating an appearance in which the cube type buttons 30 and the shift lever panel 20 according to various embodiments of the present invention are separated, and FIG. 2B is a perspective view illustrating an appearance in which the cube type buttons 30 and the shift lever panel 20 according to the exemplary embodiment of the present invention are assembled.

The cube type electronic shift lever according to the exemplary embodiment of the present invention includes the shift lever panel 20 which is mounted on a console surface or a center fascia 10 of a vehicle, and has a seating unit 21 having a plurality of position fixing magnets 22, a plurality of cube type buttons 30 which have metallic plates 31 coupled to lower portions of the plurality of cube type buttons 30, and are detachably installed on the seating unit 21 of the shift lever panel 20, an operating unit 40 which is embedded in each of the plurality of cube type buttons 30, and sends an operational signal generated by the cube type button 30, and a control unit 50 which is coupled to the shift lever panel 20, and transmits operational signals sent by the cube type buttons 30 to a transmission control unit (TCU) or an electronic control unit (ECU) of the vehicle, in which shapes and functions of the plurality of cube type buttons 30 may be arbitrarily varied and selected.

The console surface or the center fascia 10 of the vehicle is a part that constitutes a dashboard of the vehicle. The console surface is installed in a flat box shape so as to protect the shift lever from dust or impact, and the center fascia is positioned between a driver seat and a front passenger seat, and is a part where various types of buttons such as a frequency adjustment button or a volume adjustment button of a radio, operation and adjustment buttons for an air conditioner for cooling and heating the interior of the vehicle, and buttons for operating heating seats mounted in the driver seat and the front passenger seat are disposed so as to improve the convenience in driving the vehicle.

The shift lever panel 20 is mounted on the console surface or the center fascia 10, provides a seating surface on which the cube type buttons 30 may be installed as will be described below, and serves to provide the control unit 50 that supplies electric power to the cube type buttons 30, and reads and controls the operational signals recognized by the cube type buttons 30.

As illustrated in FIG. 1, the seating unit 21 is recessed in a central portion of the shift lever panel 20, and the position fixing magnets 22 are disposed on a bottom surface of the seating unit 21 so that the metallic plates 31 of the cube type buttons 30, which will be described below, may be attached to the position fixing magnets 22.

The plurality of position fixing magnets 22 may be disposed at equal intervals on the bottom surface of the seating unit 21 of the shift lever panel 20.

The purpose of this configuration is to easily attach the cube type button 30 to a proper location on the seating unit 21 of the shift lever panel 20 regardless of the form of the cube type button 30 which may be varied in various forms.

In various embodiments, at least four position fixing magnets 22 are disposed at equal intervals on the bottom surface of the seating unit 21 in each horizontal direction and in each vertical direction, respectively, but the arrangement of, the number of, and the intervals between the position fixing magnets 22 may be modified in various forms.

As illustrated in FIG. 1, the shift lever panel 20 and the seating unit 21 are formed to have a square shaped cross section, but the shift lever panel 20 and the seating unit 21 may be formed to have a cross section having a circular shape, an elliptical shape, a rectangular shape, or the like depending on the type of vehicle, and a shape of the cube type button 30 that is inserted into the seating unit 21.

The cube type button 30 has the metallic plate 31 which is coupled to the lower portion thereof, and detachably attached to the position fixing magnet 22 of the shift lever panel 20, and in various embodiments, the metallic plate 31 may be formed to correspond to the position of the position fixing magnet 22, or may be formed on the entirety or a part of the lower portion of the cube type button 30.

As illustrated in FIGS. 2A and 2B, the seating unit 21 of the shift lever panel 20 is filled with the cube type buttons 30 desired by the driver, such that a P-stage button 32, an R-stage button 33, an N-stage button 34, a D-stage button 35, and the like may be disposed at locations where the driver can easily manipulate the buttons.

Figure 3A:
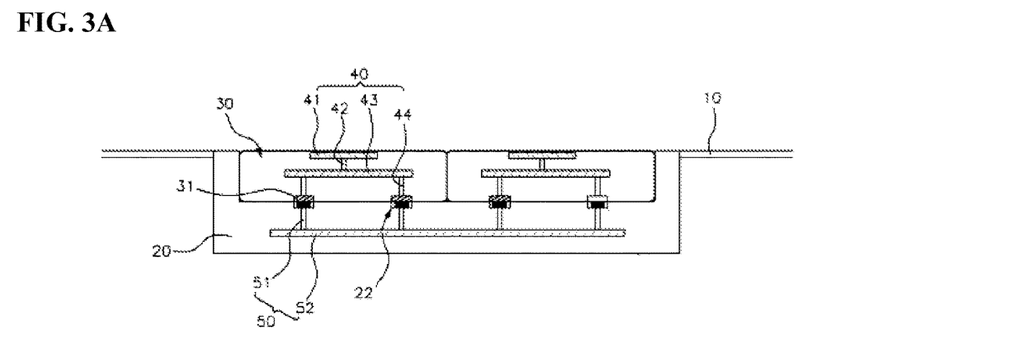
FIG. 3A is a cross-sectional view taken along line A-A' of FIG. 2B, according to the present invention.
Figure 3B:
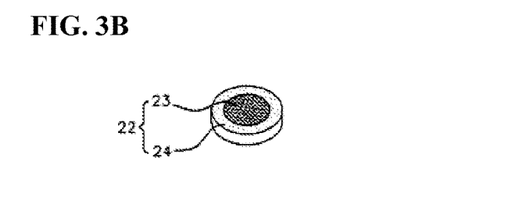
FIG. 3B is an enlarged perspective view of a position fixing magnet according to the present invention.

FIGS. 3A and 3B are a cross-sectional view taken along line A-A' of FIG. 2B, and an enlarged perspective view of the position fixing magnet 22 respectively, according to various embodiments of the present invention.

As illustrated in FIGS. 3A and 3B, the operating unit 40, which sends the operational signal generated by the cube type button 30 to the control unit 50 that will be described below, is formed in each of the plurality of cube type buttons 30.

In the cube type electronic shift lever according to various embodiments of the present invention, the operating unit 40 may include a touch sensor 41 which is installed on an upper surface of each of the plurality of cube type buttons 30, and recognizes an operation of the cube type button 30, a sending part 43 which is connected to the touch sensor 41 by a connecting pin 42 at a lower portion of the touch sensor 41, and creates and sends an operational signal, and first power supply pins 44 which are extended from a lower portion of the sending part 43 to the metallic plate 31 disposed on the lower portion of the cube type button 30.

The touch sensor 41 is a component that recognizes an operation of the driver, and is configured as a touch type sensor in various embodiments of the present invention, but a switch type sensor, which includes components such as a spring disposed at a lower portion thereof, may be applied.

When the driver touches the touch sensor 41 so as to operate the touch sensor 41, an operational signal of the touch sensor 41 is transmitted and sent to the sending part 43 by the connecting pin 42 connected to the lower portion of the touch sensor 41, and the control unit 50, which will be described below, reads the operational signal, and transmits the operational signal to the respective control units of the vehicle.

As illustrated in FIGS. 3A and 3B, each of the plurality of position fixing magnets 22 may include a power supply portion 23 which is in contact with the metallic plates 31 of each of the plurality of cube type buttons 30, and supplies electric power to the metallic plate 31, and a magnet portion 24 which is coupled to the power supply portion 23, and is in contact with the metallic plate 31 so as to fix the metallic plate 31.

The power supply portion 23 is disposed on a surface of the seating unit 21 of the shift lever panel 20 so as to be in contact with the metallic plate 31 of the cube type button 30 when the cube type button 30 is seated on the shift lever panel 20, and serves to supply electric power to the cube type button 30 and the control unit 50 that will be described below.

The magnet portion 24, which fixes the gear shift stage cube using magnetic force, is formed on the power supply portion 23, and in various embodiments, the magnet portion 24 is coupled while surrounding an outer circumferential surface of the power supply portion 23, but the magnet portion 24 may be partially formed at a center in the power supply portion 23 or on the outer circumferential surface of the power supply portion 23 depending on modification of the shift lever panel 20.

As described in various embodiments, the position fixing magnet 22 integrally includes the power supply portion 23 and the magnet portion 24, and as a result, the position fixing magnet 22 may be more easily supplied with electric power, and may more easily fix the cube type button 30 using a comparatively simple structure.

As illustrated in the cross-sectional view in FIG. 3A, the control unit 50 may include a reader 52 which is coupled in the shift lever panel 20, and reads the operational signal sent from the operating unit 40, and a second power supply pin 51 which is extended from the power supply portion 23 to the reader 52, and supplies electric power to the reader 52.

Like the first power supply pin 44, the second power supply pin 51 serves to transmit electric power generated from the power supply portion 23 to the reader 52, and is embedded in the shift lever panel 20, and the reader 52, which reads a signal sent from the operating unit 40, is installed at an end of the second power supply pin 51.

Although not illustrated, the reader 52 is connected to the TCU or the ECU of the vehicle, and serves to read the operational signal sent from the operating unit 40, and thereafter, to transmit the operational signal to the TCU or the ECU.

In the cube type electronic shift lever according to various embodiments of the present invention, the sending part 43 may be a radio-frequency identification (RFID) tag that is configured so that the plurality of cube type buttons 30 may send different electric waves, respectively, and the reader 52 may be a radio-frequency identification (RFID) reader that is configured to read the electric waves that are generated by the plurality of cube type buttons 30 and sent through the operating unit 40.

An RFID technology refers to a technology for identifying information at a long distance using electric waves, and adopts the RFID tag and the RFID reader. The RFID tag includes an antenna and an integrated circuit, and is used in a way that information is recorded in the integrated circuit, and sent to the RFID reader through the antenna.

That is, the RFID tags, which may be identified, respectively, like a barcode system, are embedded in the plurality of cube type buttons 30. When the driver operates the cube type button 30, a predetermined electric wave is generated, and the reader 52 reads the signal, and identifies the currently selected option.

Therefore, the cube type electronic shift lever according to the present invention may perform various types of functions of the vehicle by reading various gear shifting operations and options in a unified manner using a comparatively simple structure without using a complicated mechanical device.

Figure 4A:
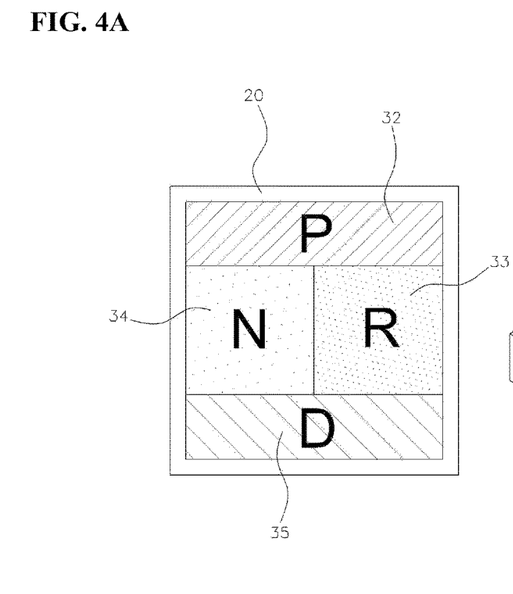
FIGS. 4A to 4B are top a plan view and a perspective view respectively, illustrating an appearance of an exemplary cube type electronic shift lever according to the present invention.
Figure 4B:
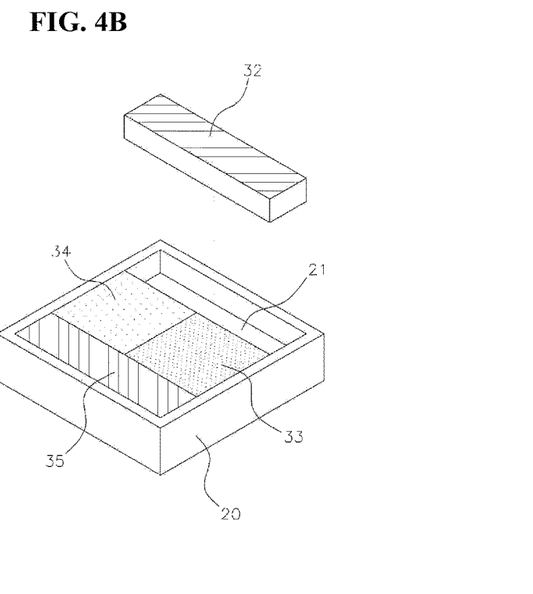

FIGS. 4A and 4B are a top plan view and a perspective view illustrating an appearance of a cube type electronic shift lever respectively, according to various embodiments of the present invention, and FIGS. 5A to 5D are top plan views and a perspective view illustrating appearances of the cube type electronic shift levers according to various embodiments of the present invention.

The plurality of cube type buttons 30 includes one or more buttons among a P-stage button 32 which generates an operational signal that changes the gear shift stage of the vehicle to the P-stage, an R-stage button 33 which generates an operational signal that changes the gear shift stage of the vehicle to the R-stage, an N-stage button 34 which generates an operational signal that changes the gear shift stage of the vehicle to the N-stage, and a D-stage button 35 which generates an operational signal that changes the gear shift stage of the vehicle to the D-stage.

As illustrated in FIG. 2B, the driver may configure the gear shift stages of the vehicle by allowing the P-stage button 32, the R-stage button 33, the N-stage button 34, and the D-stage button 35, which are formed in a square block shape, respectively, to be seated on the shift lever panel 20, or as illustrated in FIGS. 4A and 4B, the P-stage button 32 and the D-stage button 35 may be formed in a rectangular block shape, and the N-stage button 34 and the R-stage button 33 may be formed in a square block shape.

That is, the driver may freely dispose the cube type button 30 having a shape desired by the driver (for example, the button, which is mainly used by the driver, may have a greater size than the other buttons) on the seating unit 21 of the shift lever panel 20 with the desired arrangement (for example, the button, which is mainly used by the driver, may be disposed at the top of the seating unit 21).

As illustrated in FIGS. 5A to 5D, the driver may additionally dispose functional buttons, which are configured to perform various types of functions, on the shift lever panel 20, in addition to the P-stage button 32, the R-stage button 33, the N-stage button 34, and the D-stage button 35 which are basically disposed.

Figure 5A:
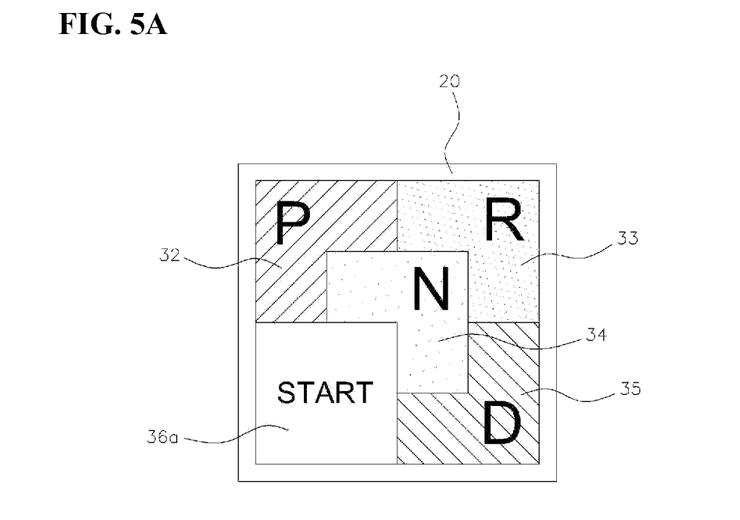
FIGS. 5A to 5D are top plan views and a perspective view illustrating appearances of exemplary cube type electronic shift levers according to the present invention.

FIG. 5A illustrates the shift lever panel 20 having a START button 36a that is additionally disposed on the shift lever panel 20 on which the cube type buttons 30 having the configuration as illustrated in FIG. 4 are disposed, and the START button 36a is a button for performing an operation of turning on/off an engine of the vehicle.

In various embodiments, the START button 36a a is formed in a square block shape, and disposed at a left lower end of the shift lever panel 20, and the P-stage button 32, the R-stage button 33, the N-stage button 34, and the D-stage button 35 are formed in an L-shaped block shape, respectively.

Figure 5B:
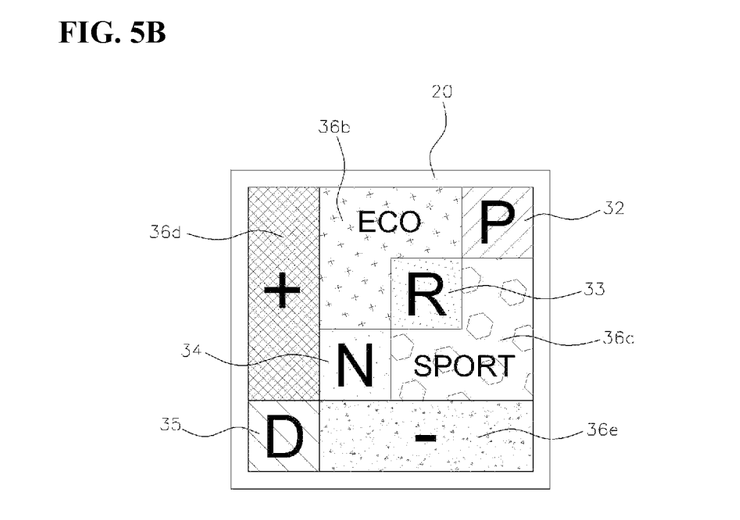

FIG. 5B illustrates the shift lever panel 20 having an ECO button 36b, a SPORT button 36c, a "+" button 36d, and a "−" button 36e that are additionally disposed on the shift lever panel 20 on which the cube type buttons 30 are disposed. The ECO button 36b is a button for turning on/off an ECO function of reducing fuel of the vehicle, the SPORT button 36c is a button for turning on/off a SPORT function of power driving of the vehicle, and the "+" button 36d and the "−" button 36e are buttons for increasing/decreasing a gear ratio in a manual mode.

In various exemplary embodiments, the ECO button 36b and the SPORT button 36c are formed in a L-shaped block shape, the "+" button 36d and the "−" button 36e are formed in a rectangular block shape, and the P-stage button 32, the R-stage button 33, the N-stage button 34, and the D-stage button 35 are each formed in a square block shape.

Figure 5C:
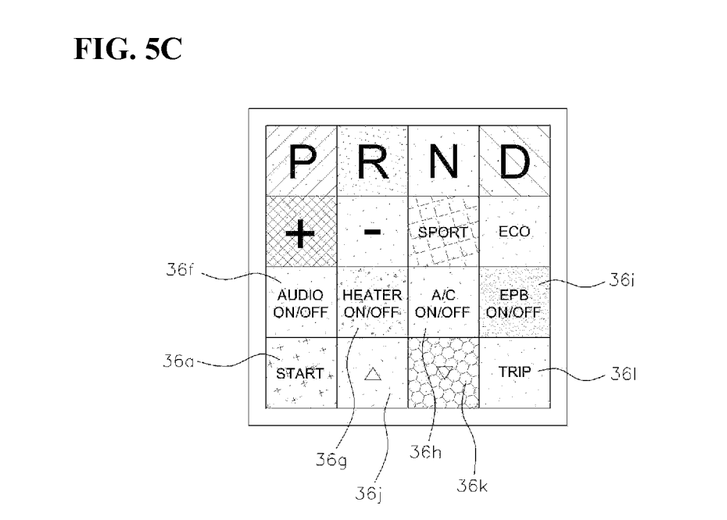

FIG. 5C illustrates the shift lever panel 20 having an AUDIO button 36f, a HEATER button 36g, an A/C button 36h, an EPB (electric parking brake) button 36i, a START button 36a, an up (Δ) button 36j, a down (∇) button 36k, and a TRIP button 36l that are additionally disposed on the shift lever panel 20 on which the cube type buttons 30 having the configuration as illustrated in FIG. 5B are disposed.

The AUDIO button 36f, the HEATER button 36g, and the A/C button 36h are buttons for performing operations of turning on/off an audio system, a heater, and an air conditioner of the vehicle, respectively, the EPB button 36i is a button for performing an EPB function of assisting in parking the vehicle on a slope or the like based on information on a weight of the vehicle and a gradient of a road surface, the up button 36j and the down button 36k are buttons for performing operations of increasing or decreasing volume of the audio system, heat intensity of the heater, and wind intensity of the air conditioner, respectively, and the TRIP button 36l is a button for correcting a cluster screen of the vehicle.

In various embodiments, all of the ECO button 36b, the SPORT button 36c, the "+" button 36d, the "−" button 36e, the AUDIO button 36f, the HEATER button 36g, the A/C button 36h, the EPB button 36i, the START button 36a, the up button 36j, the down button, the TRIP button 36l, the P-stage button 32, the R-stage button 33, the N-stage button 34, and the D-stage button 35 are each formed in a small square block shape.

Figure 5D:
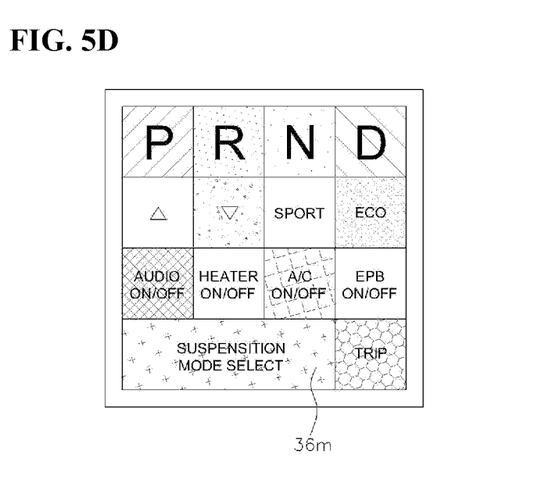

FIG. 5D illustrates the shift lever panel 20 in which the START button 36a, the up button 36j, and the down button 36k are eliminated from the shift lever panel 20 on which the cube type buttons 30 have the configuration as illustrated in FIG. 5C, a SUSPENSION MODE SELECT button 36m is additionally disposed, and the up button 36j and the down button 36k are disposed instead of the "+" button 36d and the "−" button 36e, and the SUSPENSION MODE SELECT button 36m is a button for performing a function of changing strength of the suspension of the vehicle.

In various embodiments, the SUSPENSION MODE SELECT button 36m is formed in a rectangular block shape, and disposed at a left lower end of the shift lever panel 20, and the remaining buttons are formed in a square block shape.

As illustrated in FIGS. 5A to 5D, the driver may freely install the cube type buttons 30, which have various sizes and shapes (for example, a square block shape, a rectangular block shape, and the like) and various functions (for example, a function of starting the engine, a function regarding the audio system, and the like) on the seating unit 21 of the shift lever panel 20 with a desired arrangement.

Of course, the aforementioned size, shape and function of the cube type button 30 are merely one example, and cube type buttons 30 having various sizes, shapes and functions may be additionally disposed on the shift lever panel 20 depending on preference of the driver.

The driver may freely dispose the cube type buttons 30 at a convenient location by using the cube type electronic shift lever according to the present invention, thereby remarkably improving operational characteristics of the vehicle, and improving marketability of the vehicle while satisfying various preferences of the driver.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An electronic shift apparatus comprising:
   a shift panel mounted on a console surface or a center fascia of a vehicle, and having a seating unit including a plurality of position fixing magnets;
   a plurality of cubical buttons including metallic plates coupled to lower portions of the plurality of cubical buttons, the plurality of cubical buttons being detachably installed on the seating unit of the shift panel;
   an operating unit embedded in each of the plurality of cubical buttons, and sending operational signals generated by each of the plurality of cubical buttons; and
   a control unit configured to transmit the operational signals sent by the each of the plurality of cubical buttons to a transmission control unit (TCU) or an electronic control unit (ECU) of the vehicle,
   wherein shapes and functions of the plurality of cubical buttons are arbitrarily varied and selected, and
   wherein each of the plurality of position fixing magnets includes:

a power supply portion in contact with each metallic plate of each of the plurality of cubical buttons, and supplying electric power to each metallic plate; and a magnet portion coupled to the power supply portion, and in contact with each metallic plate to fix each metallic plate.

2. The electronic shift apparatus of claim 1, wherein the operating unit includes:

a touch sensor installed on an upper surface of each of the plurality of cubical buttons, and recognizing an operation of each of the cubical buttons;

a sending part connected to a lower portion of the touch sensor by a connecting pin, and creating and sending an operational signal; and a first power supply pin extending from a lower portion of the sending part to a metallic plate disposed on each of the lower portions of each of the cubical buttons.

3. The electronic shift apparatus of claim 2, wherein the sending part is a radio-frequency identification (RFID) tag configured so that each of the plurality of cubical buttons sends different electric waves.

4. The electronic shift apparatus of claim 1, wherein the control unit includes:

a reader coupled in the shift panel, and reading the operational signals sent from the operating unit; and a second power supply pin extending from the power supply portion to the reader, and supplying electric power to the reader.

5. The electronic shift apparatus of claim 4, wherein the reader is a radio-frequency identification (RFID) reader configured to read electric waves generated by the plurality of cubical buttons and sent through the operating unit.

6. The electronic shift apparatus of claim 1, wherein the plurality of position fixing magnets are disposed at equal intervals on a bottom surface of the seating unit of the shift panel.

7. The electronic shift apparatus of claim 1, wherein the plurality of cubical buttons includes one or more buttons among a P-stage button which generates an operational signal that changes a gear shift stage of the vehicle to a P-stage, an R-stage button which generates an operational signal that changes the gear shift stage of the vehicle to an R-stage, an N-stage button which generates an operational signal that changes the gear shift stage of the vehicle to an N-stage, and a D-stage button which generates an operational signal that changes the gear shift stage of the vehicle to a D-stage.

8. The electronic shift apparatus of claim 7, wherein the plurality of cubical buttons further includes functional buttons, which are configured to perform various functions, in addition to the P-stage button, the R-stage button, the N-stage button, and the D-stage button.

9. The electronic shift apparatus of claim 1, wherein the plurality of cubical buttons has one or more shapes among a square block shape, a rectangular block shape, an L-shaped block shape, and a C-shaped block shape.

* * * * *